(12) United States Patent  (10) Patent No.: US 7,533,853 B2
Ogawa  (45) Date of Patent: May 19, 2009

(54) CLIP STRUCTURE AND WIRE-LIKE MEMBER FIXING METHOD

(75) Inventor: Tatsuo Ogawa, Kosai (JP)

(73) Assignee: Yazaki Corporation, Tokyo (JP)

( * ) Notice: Subject to any disclaimer, the term of this patent is extended or adjusted under 35 U.S.C. 154(b) by 225 days.

(21) Appl. No.: 11/116,430

(22) Filed: Apr. 28, 2005

(65) Prior Publication Data

US 2005/0253026 A1  Nov. 17, 2005

(30) Foreign Application Priority Data

Apr. 28, 2004  (JP) .......................... P.2004-133524

(51) Int. Cl.
*F16L 3/08*  (2006.01)
(52) U.S. Cl. ...................... 248/74.1; 248/73; 172/72 A
(58) Field of Classification Search ................ 248/74.1, 248/49, 65, 75, 67, 72, 73, 74.2, 664; 174/72 A, 174/135
See application file for complete search history.

(56) References Cited

U.S. PATENT DOCUMENTS

| | | | | |
|---|---|---|---|---|
| 2,981,351 A | * | 4/1961 | Knickerbocker et al. .... | 180/311 |
| 3,270,992 A | * | 9/1966 | Cassel .......................... | 248/60 |
| 4,871,134 A | * | 10/1989 | Oikawa ........................ | 248/65 |
| 5,024,405 A | * | 6/1991 | McGuire ...................... | 248/73 |
| 5,218,881 A | * | 6/1993 | Nowak ....................... | 74/502.6 |
| 5,230,488 A | * | 7/1993 | Condon ........................ | 248/73 |
| 5,390,882 A | * | 2/1995 | Lee et al. .................... | 248/68.1 |
| 5,725,185 A | * | 3/1998 | Auclair ....................... | 248/74.2 |
| 5,760,338 A | * | 6/1998 | Suzuki ...................... | 174/72 A |
| 5,962,814 A | * | 10/1999 | Skipworth et al. .......... | 174/135 |
| 6,206,331 B1 | * | 3/2001 | Keith et al. ................ | 248/74.1 |
| 7,131,170 B2 | * | 11/2006 | Weaver ........................ | 24/545 |
| 7,140,070 B2 | * | 11/2006 | Yuta et al. ........................ | 16/4 |
| 2002/0129961 A1 | * | 9/2002 | Baker ....................... | 174/72 A |

FOREIGN PATENT DOCUMENTS

| | | | | |
|---|---|---|---|---|
| GB | 2087968 A | * | 6/1982 | |
| JP | 5-073388 U | | 10/1993 | |
| JP | 09046865 A | * | 2/1997 | |
| JP | 10322862 A | * | 12/1998 | |
| JP | 11168819 A | * | 6/1999 | |
| JP | 2000-166061 A | | 6/2000 | |
| JP | 2001258138 A | * | 9/2001 | |
| JP | 2001-289357 A | | 10/2001 | |
| JP | 2002-152954 A | | 5/2002 | |

* cited by examiner

*Primary Examiner*—Anita M King
(74) *Attorney, Agent, or Firm*—Sughrue Mion, PLLC

(57) ABSTRACT

There are disclosed a clip structure for installing a wire-like member and a tubular member on a mounting member and a wire-like member fixing method. The structure includes a base portion 11, a wire-like member fixing portion 12 which is formed on one side of the base portion 11 so as to fix the wire-like member to the wire-like member fixing portion, and a tubular member fixing portion 13 which is formed on the other side of the base portion 11 so as to fix the tubular member to the tubular member fixing portion. The base portion 11 is mounted on the mounting member in such a manner that the tubular member, fixed to the tubular member fixing portion 13, can be received in a recess formed in the mounting member.

5 Claims, 5 Drawing Sheets

CLIP STRUCTURE AND WIRE-LIKE MEMBER FIXING METHOD

BACKGROUND OF THE INVENTION

1. Field of the Invention

This invention relates to a clip structure used for installing a wire harness, a drain hose and the like on a vehicle body panel, and also relates to a method of fixing a wire-like member.

2. Related Art

There is known one conventional clip structure for installing wire harnesses on a vehicle body panel, in which a rib for abutting against the panel is formed on that portion of a base portion corresponding to a grip portion (see, for example, Unexamined Japanese Patent Publication 2001-289357).

As shown in FIG. 6, the clip structure, disclosed in this publication, includes the plate-like base portion 51, a connecting leg portion 53 which is formed on a reverse surface of the base portion 51 so as to connect the base portion 51 to the vehicle body panel 52, an auxiliary leg portion 54 provided so as to keep a gap, formed between the base portion 51 and the vehicle body panel 52 by the connecting leg portion 53, generally uniform, and the grip portion 58 including support posts 57, 57 and 57 formed upright on a front surface of the base portion 51. Retaining projections 56 for retaining the wire harnesses 55, 55 and 55 are formed on the support posts 57 such that the opposed retaining projections 56 and 56, formed respectively on any two adjacent support posts 57 and 57, can retain the corresponding wire harness 55 against withdrawal. The rib 59 is formed on that portion of the reverse surface of the base portion 51 corresponding to the grip portion 58, and has such a height as to abut against the vehicle body panel 52.

In this clip structure, even if a resistance is produced by the retaining projections 56 and 56 when inserting each wire harness 55 between the corresponding opposed support posts 57 and 57, the base portion 51 is prevented from being curved or bent toward the panel 52, thus preventing distal ends of the opposed support posts 57 and 57 from being displaced toward each other, and therefore each wire harness 55 can be easily inserted between the corresponding support posts 57 and 57.

There is known another clip structure in which a projection is formed on an inner surface of a resilient grasp portion for contact with a reinforce, and this projection is retainingly engaged in a retaining hole formed in the reinforce (see, for example, Unexamined Japanese Patent Publication 2000-166061).

As shown in FIGS. 7A and 7B, in the clip structure disclosed in this publication, a band-like grasp portion 62 for grasping a wire harness 61 (comprising a bundle of wires), as well as the resilient grasp portion 64 of a generally U-shape for resiliently grasping the reinforce 63, is formed integrally on a clamp 60. The projection 66 is formed on a bottom of the resilient grasp portion 64, and projects toward an opening thereof, and this projection 66 is retainingly engaged in the retaining hole 65 formed in the reinforce 63.

In this clip structure, the resilient grasp portion 64 of the clamp 60 for grasping the reinforce 63 has an open end, and can be opened and closed. The revolution of the wire harness 61 in a circumferential direction relative to the reinforce 63, as well as the movement of the wire harness 61 in a longitudinal direction relative to the reinforce 63, is prevented by retaining engagement of the projection 66 (formed on the inner surface of the resilient grasp portion 64) in the retaining hole 65 in the reinforce 63, and therefore the wire harness 61 can be easily attached to and detached from the reinforce 63. And besides, the wire harness 61 and the reinforce 63 are grasped by the single clamp 60, and therefore the wire harness 61, grasped by the grasp portion 62, will not revolve relative to the reinforce 63.

Usually, it is desirable that a tubular member such as a drain hose be disposed in a recess, formed in a vehicle body panel so that the drain hose will not be exposed to the exterior so as to prevent the crushing of the tubular member which would otherwise occur upon striking against other member.

In the above first publication, however, although the wire harnesses 55 can be held on the vehicle panel 52, a tubular member such as a drain hose can not be mounted in a recess formed in the vehicle body panel.

In the above second publication, although the wire harness 62 can be held on the reinforce 63, the reinforce 63 and the wire harness 62 can not be fixed to the vehicle body panel. Therefore, the reinforce 63 can not be mounted in a recess formed in a floor panel as is the case with the above first publication.

SUMMARY OF THE INVENTION

This invention has been made in view of the above circumstances, and an object of the invention is to provide a clip structure as well as a wire-like member fixing method, in which a tubular member can be fixed to a mounting member in such a manner that the tubular member can be received in a recess formed in the mounting member, and at the same time a wire-like member can be fixed to the mounting member.

According to the present invention, there is provided a clip structure for installing a wire-like member and a tubular member on a mounting member, characterized in that the clip structure includes a plate-like base portion, a wire-like member fixing portion which is formed on one side of the base portion so as to fix the wire-like member to the wire-like member fixing portion, and a tubular member fixing portion which is formed on the other side of the base portion so as to fix the tubular member to the tubular member fixing portion; and the base portion is mounted on the mounting member in such a manner that the tubular member, fixed to the tubular member fixing portion, can be received in a recess formed in the mounting member.

One example of the wire-like member, recited in the described above, is a wire harness comprising a bundle of wires. Examples of the tubular member include a drain hose used for returning return fuel from a fuel supply system to a fuel tank, and a drain hose for discharging rain water from a sunroof lid. Examples of the mounting member include a floor panel and a dash lower panel which form a vehicle body panel.

In the clip structure recited in the described above, the wire-like member is fixed to the wire-like member fixing portion in such a manner that when the base portion is mounted on the mounting member, the tubular member, fixed to the tubular member fixing portion, can be received in the recess formed in the mounting member. Therefore, the tubular member and the wire-like member can be simultaneously fixed to the mounting member in such a manner that the tubular member is not exposed to the exterior so as to prevent the crushing of the tubular member which would otherwise occur upon striking against other member.

The clip structure of the invention of the described above is further provided in that the base portion has an arm portion projecting therefrom in a direction perpendicular to the wire-like member, fixed to the wire-like member fixing portion, and the tubular member fixed to the tubular member fixing portion; and a retaining portion for engagement with the mounting member is formed on the arm portion.

In the clip structure recited in the described above, the retaining portion for retaining engagement with the mounting member is formed on the arm portion disposed perpendicularly to the wire-like member and the tubular member, and with this construction the wire-like member fixing portion, the tubular portion fixing portion and the arm portion with the retaining portion are formed with high rigidity, and therefore can prevent deformation such as bending or elastic deformation.

The clip structure of the invention of the described above is further characterized in that the retaining portion is disposed at a region spaced from the wire-like member fixing portion in a direction of projecting of the arm portion.

In the clip structure recited in the described above, the retaining portion for retaining engagement with the mounting member is formed at the region spaced from the wire-like member fixing portion in the direction of projecting of the arm portion which is disposed perpendicularly to the wire-like member and the tubular member. Therefore, when the retaining portion is to be retainingly engaged with the mounting member, the retaining portion can be easily brought into registry with engagement means (such as an engagement hole) formed at the mounting member. Therefore, the efficiency of the operation can be enhanced.

According to the invention, there is provided a method of fixing a wire-like member provided in that when the wire-like member to which a clip, having a tubular member fixing portion and a wire-like member fixing portion formed respectively on opposite sides thereof, is beforehand fixed is to be mounted on a vehicle, a tubular member is fixed to the clip, and subsequently the clip is fixed to the vehicle in such a manner that the tubular member is installed in a recess formed in the vehicle.

In the wire-like member fixing method of the described above, the tubular member is fixed to the clip, and thereafter the tubular member is installed in the recess formed in the vehicle, and therefore an undue force will not act on the tubular member.

The clip structure and the wire-like member fixing method of the invention can solve the problem that a tubular member such as a drain hose can not be installed in a recess formed in a vehicle body panel, and there is achieved an advantage that the clip can be fixed to the mounting member in such a manner that the tubular member is installed in the recess formed in the mounting member, and at the same time the wire-like member can be fixed to the mounting member.

DETAILED DESCRIPTION OF THE PREFERRED EMBODIMENTS

A preferred embodiment of a clip structure of the present invention, as well as a wire-like member fixing method of the invention, will now be described in detail with reference to the drawings.

Figure 1:
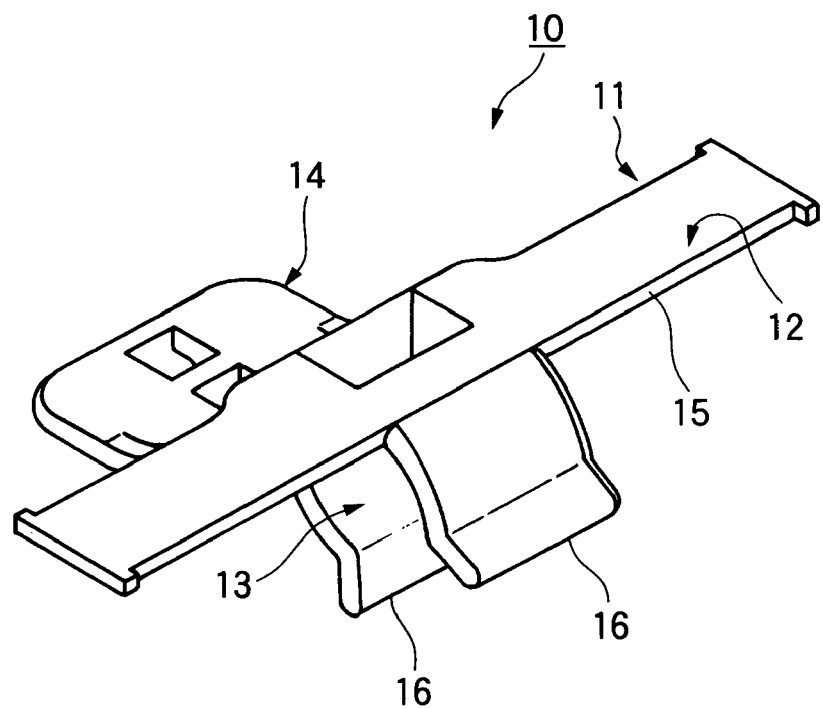
FIG. 1 is a perspective view of a clip, showing its appearance for the purpose of explaining a preferred embodiment of a clip structure of the present invention and a wire-like member fixing method of the invention.

As shown in FIG. 1, the clip 10, used in the clip structure and the wire-like member fixing method of the invention, mainly includes a base portion 11, a harness fixing portion 12, a hose fixing portion 13, and an arm portion 14.

Figure 5:
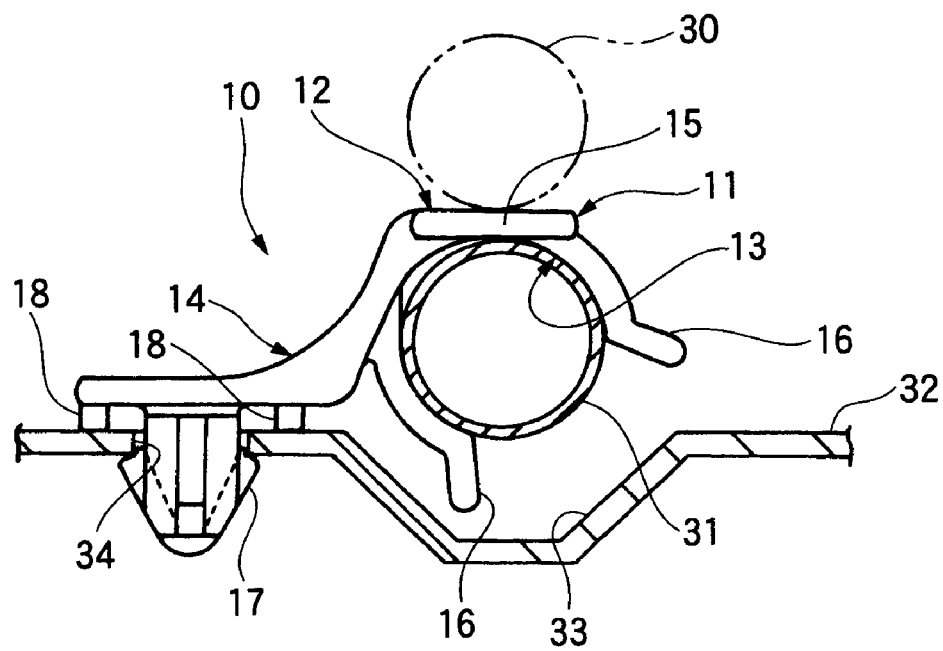
FIG. 5 is a front-elevational view of the structure of FIG. 4.
Figure 6:
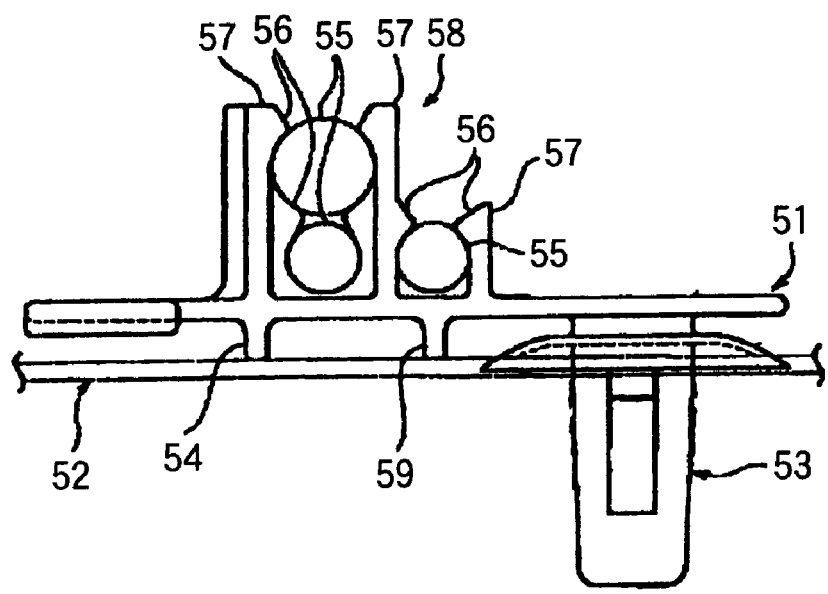
FIG. 6 is a front-elevational view of a conventional clip structure.
Figure 7:
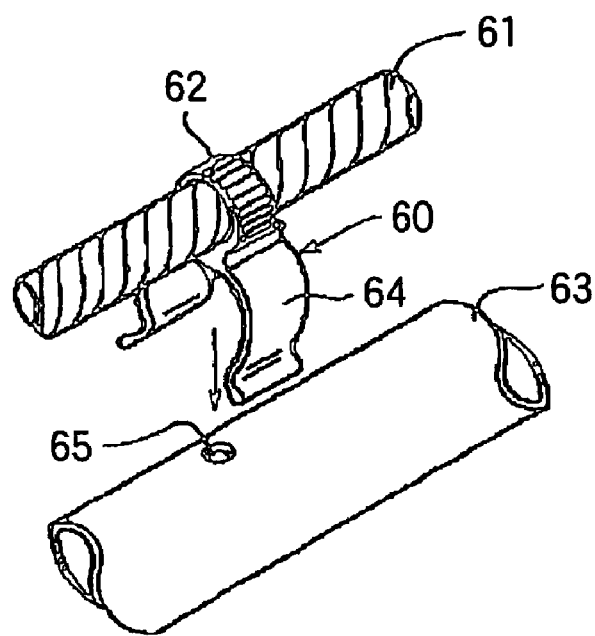
FIG. 7A is a view of a conventional clip structure different from the clip structure of FIG. 6, showing its appearance.
FIG. 7B is a cross-sectional view of the clip structure of FIG. 7A.
Figure 7:
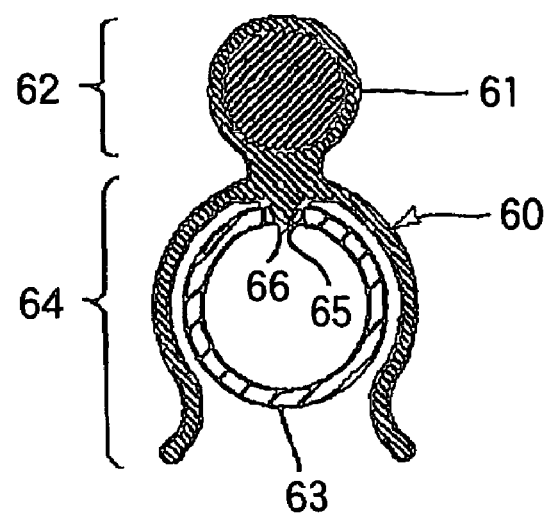

The base portion 11 includes a body 15 of a generally rectangular plate-shape made of a material with a certain degree of elasticity such for example as a polymeric material (e.g., a plastics material). The harness fixing portion 12 is formed on an upper surface (or one side) of the body 15. The harness fixing portion 12 includes projections formed at opposite ends of the body 15. A wire harness (wire-like member) 30, shown in FIG. 5, is placed on the harness fixing portion 12, and then the wire harness 30 is bound with a binding band (not shown) or an adhesive tape in such a manner that the binding band or the adhesive tape is retained by the projections against withdrawal, and by doing so, the wire harness 30 can be fixed to the harness fixing portion 12 in a manner to extend in the direction of the length of the body 15.

Figure 4:
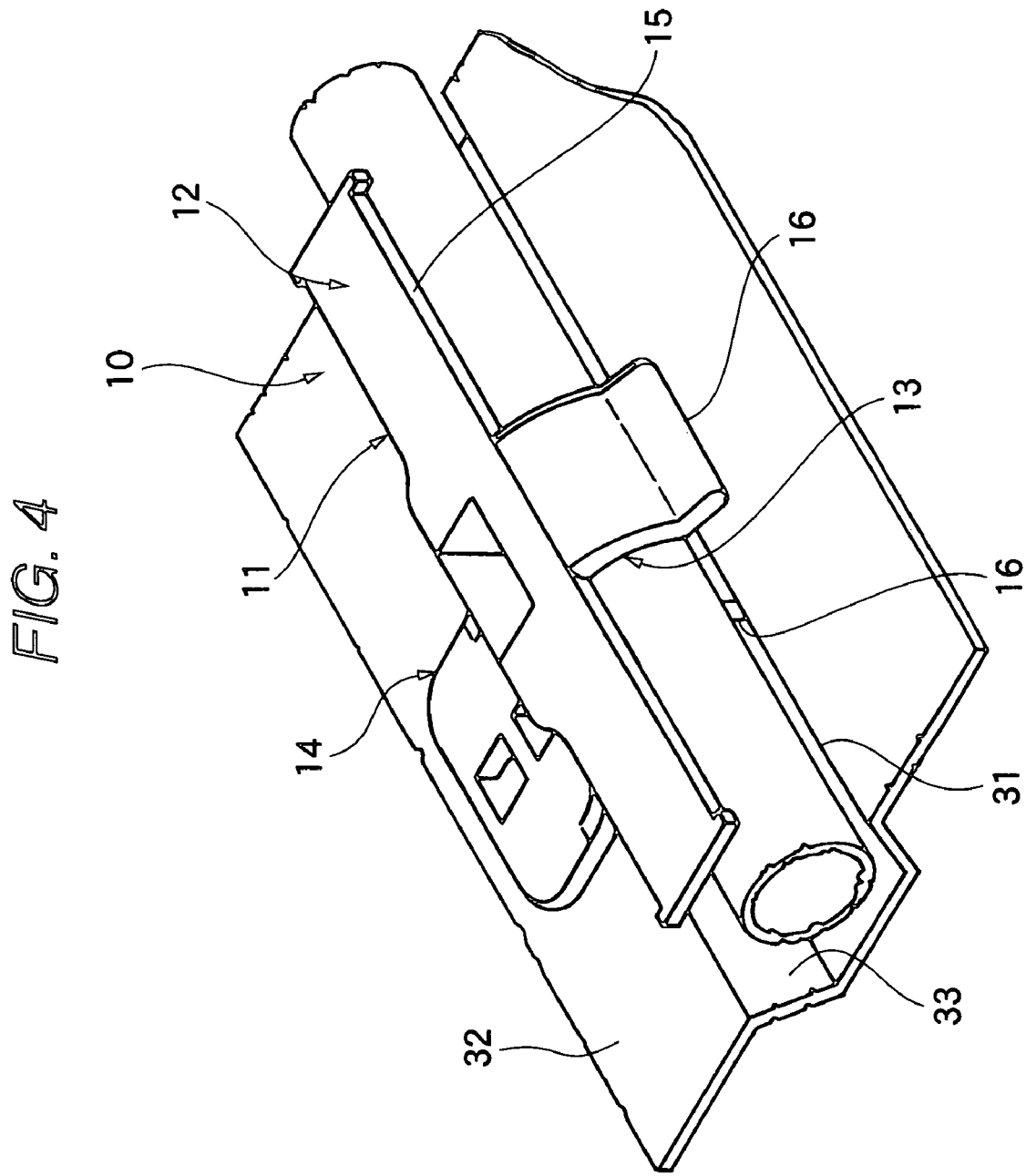
FIG. 4 is a perspective view of the clip structure of FIG. 1 mounted on a vehicle body panel.

The hose fixing portion 13 is formed on a lower surface (or the other side) of the body 15 of the base portion 11 at a central portion thereof. The hose fixing portion 13 includes a pair of opposed hose holding plates 16 and 16 which assume a generally bifurcated shape, and are slightly elastically deformable away from each other. The hose holding plates 16 and 16 project obliquely downwardly from the lower surface of the body 15. When a drain hose (tubular member) 31, shown in FIG. 4, is fitted between the hose holding plates 16 and 16 of the hose fixing portion 13, the drain hoes 31 is gripped by the hose holding plates 16 and 16, and therefore is fixed to the hose fixing portion 13 in a manner to extend in the longitudinal direction of the body 15.

The arm portion 14 has a plate-like shape, and projects from the central portion of the body 15 of the base portion 11 in a direction generally opposite to the direction of projecting of the hose holding plates 16 and 16. The arm portion 14 is formed or molded integrally with the body 15, and therefore has an increased rigidity.

Figure 2:
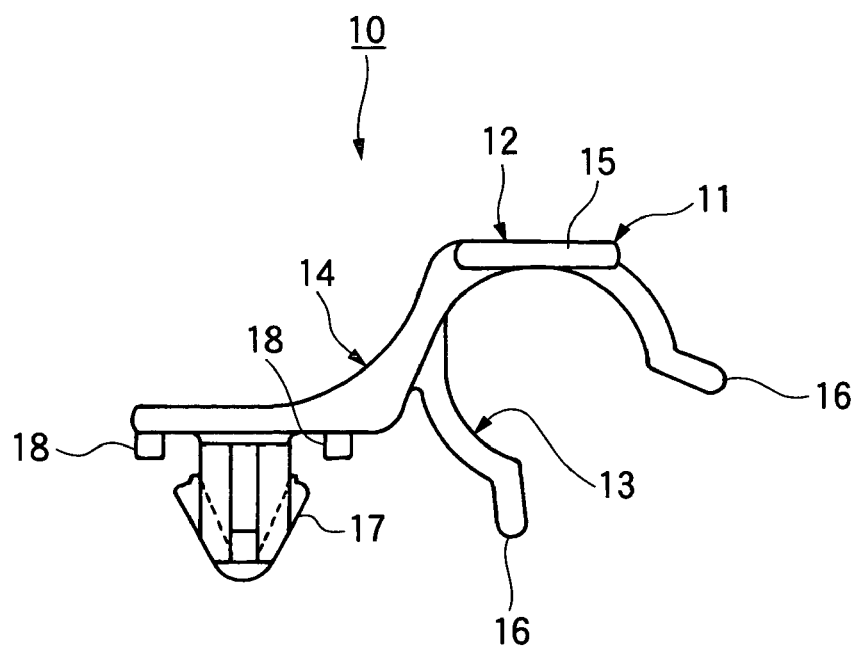
FIG. 2 is a front-elevational view of the clip of FIG. 1.

As shown in FIG. 2, the distance between distal end portions of the hose holding plates 16 and 16 is so large that the drain hose 31 can be easily fitted between the hose holding plates 16 and 16. A retaining portion 17 is formed on a lower surface of the arm portion 14. The retaining portion 17 is an elastic piece portion of a generally arrowhead-shape, and can be fitted into an engagement hole 34 which is formed in a vehicle body panel 32 (shown in FIG. 5), and is disposed near to a drain hose-receiving recess 33 in the vehicle body panel 32. A pair of ribs 18 and 18 are formed on and project from the lower surface of the arm portion 14, and are disposed respectively at opposite sides of the retaining portion 17. When the retaining portion 17 is fitted into the engagement hole 34 in the vehicle body panel 32, the retaining portion 17 is retainingly engaged with a lower surface of the vehicle body panel 32, so that the retaining portion 17 and the ribs 18 and 18, held against an upper surface of the vehicle body panel 32, cooperate with each other to fix the clip 10 onto the vehicle body panel 32.

Figure 3:
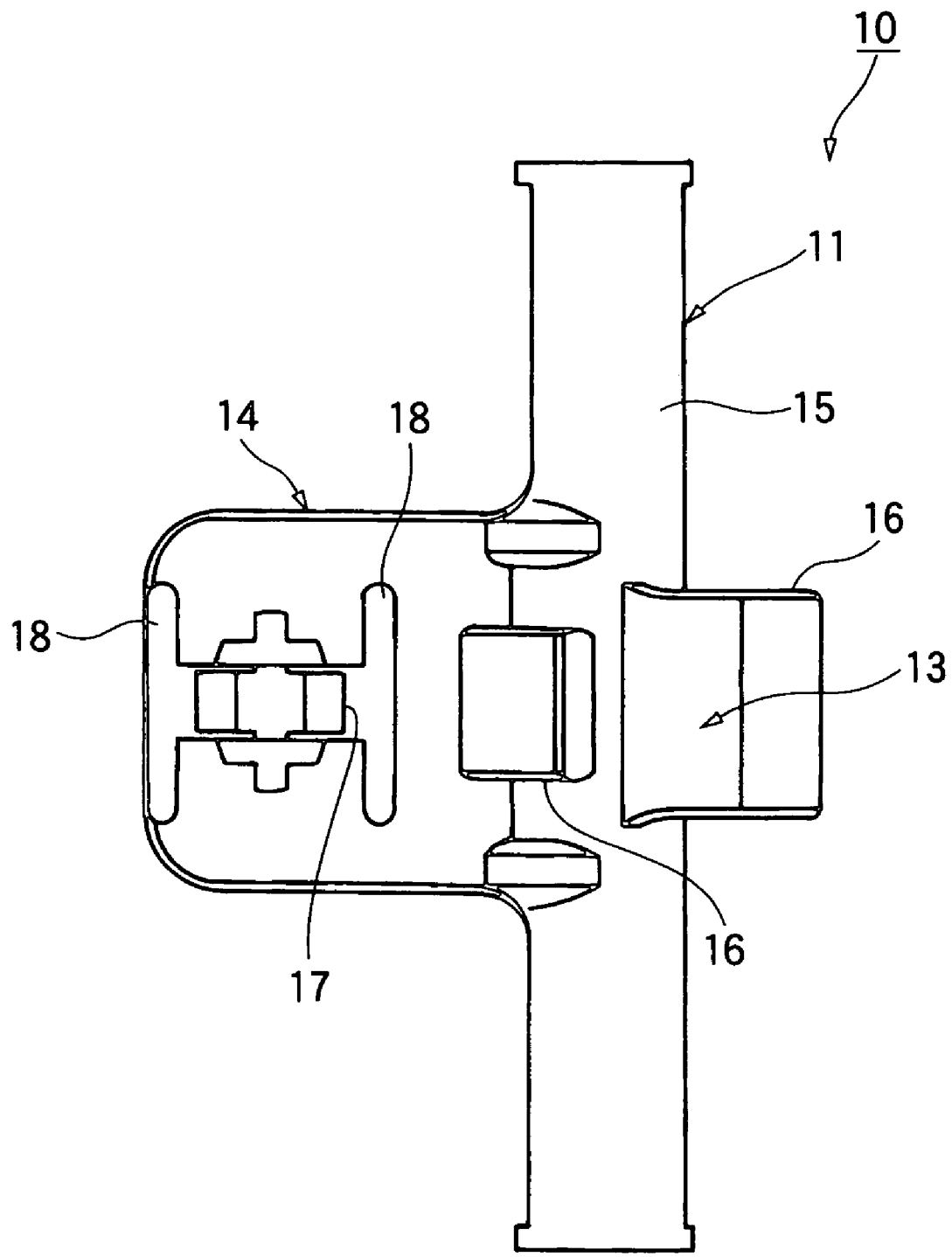
FIG. 3 is a bottom view of the clip of FIG. 2.

As shown in FIG. 3, the projecting arm portion 14 is disposed perpendicularly to the wire harness 30 (fixed to the harness fixing portion 12) and the drain hose 31 (fixed to the hose fixing portion 13), and the retaining portion 17 is disposed at a region spaced from the harness fixing portion 12 in the direction of projecting of the arm portion 14. Therefore, the harness fixing portion 12, the hose fixing portion 13 and the arm portion 14 with the retaining portion 17 are formed with high rigidity, and therefore can prevent deformation such as bending or elastic deformation. And besides, the retaining portion 17 is formed at the region spaced from the harness fixing portion 12 in the direction of projecting of the arm portion 14 which is disposed perpendicularly to the wire harness 30 and the drain hose 31, and therefore when the retaining portion 17 is to be fitted into the engagement hole 34 in the vehicle body panel 32, the retaining portion 17 can be easily brought into registry with the engagement hole 34, and therefore the efficiency of the operation can be enhanced.

Next, the operation for mounting the clip 10 will be described with reference to FIGS. 4 and 5.

The vehicle body panel 32 (which is the mounting member) on which the clip 10 is mounted is a floor panel, a dash lower panel or the like. The drain hose-receiving recess 33 is formed in the vehicle body panel 32, and the engagement hole 34 (shown in FIG. 5) is formed in the vehicle body panel 32, and is disposed near to the recess 33. The wire harness 30 is the wire-like member comprising a bundle of wires. The drain hose 31 is the tubular member for returning return fuel from a fuel supply system to a fuel tank.

For effecting the mounting operation, first, the wire harness 30 is placed on the harness fixing portion 12, and is fixed thereto by the binding band or the adhesive tape, and then the drain hose 31 is fitted between the hose holding plates 16 and 16 of the hose fixing portion 13, and is fixed to the hose fixing portion 13.

Then, the retaining portion 17 of the clip 10 to which the drain hose 31 and the wire harness 30 are fixed is fitted into the engagement hole 34 in the vehicle body panel 32. At this time, the clip 10 can take such a posture that the drain hose 31 is disposed on the lower side of the arm portion 14. Therefore, the clip 10 is mounted on the vehicle body panel 32 in such a manner that the drain hose 31, disposed on the lower side of the arm portion 14, is received in the drain hose-receiving recess 33 in the vehicle body panel 32. Thus, the drain hose 31 and the wire harness 30 can be simultaneously fixed to the vehicle body panel 32 in such a manner that the drain hose 31 is not exposed to the exterior so as to prevent the crushing of the drain hose 31 which would otherwise occur upon striking against other member.

When the retaining portion 17 is fitted into the engagement hole 34 in the vehicle body panel 32, the retaining portion 17 is retainingly engaged with the lower surface of the vehicle body panel 32, and at the same time the ribs 18 and 18 abut against the upper surface of the vehicle body panel 32, and therefore the clip 10 is fixed onto the vehicle body panel 32 against withdrawal.

As described above, in the clip structure employing the clip 10, the wire harness 30 is fixed to the harness fixing portion 12 in such a manner that when the base portion 11 is attached to the vehicle body panel 32, the drain hose 31, fixed to the hose fixing portion 13, can be received in the drain hose-receiving recess 33. Therefore, the drain hose 31 and the wire harness 30 can be simultaneously fixed to the vehicle body panel 32 in such a manner that the drain hose 31 is not exposed to the exterior so as to prevent the crushing of the drain hose 31 which would otherwise occur upon striking against other member.

In the clip structure employing the clip 10, the retaining portion 17 for retaining engagement with the vehicle body panel 32 is formed on the arm portion 14 disposed perpendicularly to the wire harness 30 and the drain hose 31, and with this construction the harness fixing portion 12, the hose fixing portion 13 and the arm portion 14 with the retaining portion 17 are formed with high rigidity, and therefore can prevent deformation such as bending or elastic deformation.

In the clip structure employing the clip 10, the retaining portion 17 for retaining engagement with the vehicle body panel 32 is formed at the region spaced from the harness fixing portion 12 in the direction of projecting of the arm portion 14 which is disposed perpendicularly to the wire harness 30 and the drain hose 31. Therefore, when the retaining portion 17 is to be retainingly engaged with the vehicle body panel 32, the retaining portion 17 can be easily brought into registry with the engagement hole 34 formed in the vehicle body panel 32, and therefore the efficiency of the operation can be enhanced.

The invention is not limited to the above embodiment, and suitable modifications, improvements and so on can be made. For example, the harness fixing portion can be so modified that a plurality of wire harnesses can be fixed thereto, and similarly the hose fixing portion can be so modified that a plurality of drain hoses can be fixed thereto. In such a case, preferably, an increased number of hose holding plates are formed.

The number of the retaining portion is not limited to one, and two (a pair of) or more retaining portions can be formed. With such a construction, the positioning of the arm portion relative to the vehicle body panel can be more positively effected. In order to avoid the increased time and labor for the operation, one retaining portion and one projection can be provided instead of providing two retaining portions, in which case the retaining portion and the projection are fitted respectively into two engagement holes in the vehicle body panel.

In view of the easier molding of the clip, the clip can be made of a synthetic rubber or the like.

What is claimed is:

1. A clip structure comprising:
    a plate-like base portion;
    a wire-like member fixing portion formed on one side of said base portion so as to fix a wire-like member to said wire-like member fixing portion at the one side of the base portion; and
    a tubular member fixing portion formed on the other side of said base portion, opposite the first side, so as to fix a tubular member to said tubular member fixing portion at the other side of the base portion,
    wherein said base portion is mounted on a mounting member of a vehicle in such a manner that said tubular member, fixed to said tubular member fixing portion, is received in a recess formed in said mounting member.

2. A clip structure according to claim 1, wherein said base portion has an arm portion projecting therefrom in a direction perpendicular to said wire-like member, fixed to said wire-like member fixing portion, and said tubular member fixed to said tubular member fixing portion; and
    wherein said arm portion has a retaining portion for engagement with said mounting member.

3. A clip structure according to claim 2, wherein said retaining portion is disposed at a region with respect to said wire-like member fixing portion in a direction defined by projecting of said arm portion.

4. A method of fixing a wire-like member and a tubular member to a portion of a vehicle, comprising the steps of:
    providing a clip having a tubular member fixing portion and a wire fixing portion on opposite sides thereof;
    fixing the wire-like member to the wire fixing portion;
    fixing the tubular member to said tubular member fixing portion of the clip;
    installing said tubular member in a recess formed in said portion of the vehicle; and
    fixing said clip to said portion of the vehicle.

5. A clip structure in combination with a mounting member of a vehicle to which said clip structure is mounted, said mounting member including a recess therein, said clip structure comprising:

a plate-like base portion;

a wire-like member fixing portion formed on one side of said base portion so as to fix a wire-like member to said wire-like member fixing portion at the one side of the base portion; and a tubular member fixing portion formed on the other side of said base portion, opposite the first side, so as to fix a tubular member to said tubular member fixing portion at the other side of the base portion, wherein said base portion is mounted on said mounting member of the vehicle in such a manner that said tubular member, fixed to said tubular member fixing portion, is received in the recess formed in said mounting member.

* * * * *